United States Patent
Strohmaier et al.

(10) Patent No.: US 6,769,246 B2
(45) Date of Patent: Aug. 3, 2004

(54) METHOD AND DEVICE FOR CONTROLLING AN EXHAUST GAS AFTERTREATMENT SYSTEM

(75) Inventors: Rainer Strohmaier, Stuttgart (DE); Stefan Zimmermann, Pfinztal (DE); Martin Bauer, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/181,070

(22) PCT Filed: Oct. 25, 2001

(86) PCT No.: PCT/DE01/04047
§ 371 (c)(1),
(2), (4) Date: Oct. 11, 2002

(87) PCT Pub. No.: WO02/38923
PCT Pub. Date: May 16, 2002

(65) Prior Publication Data
US 2003/0126858 A1 Jul. 10, 2003

(30) Foreign Application Priority Data
Nov. 11, 2000 (DE) .......................... 100 56 015

(51) Int. Cl.[7] .............................. F01N 3/00
(52) U.S. Cl. .............................. 60/297; 60/274; 60/286; 60/295
(58) Field of Search .................. 60/274, 277, 295, 60/297, 286, 311, 303

(56) References Cited

U.S. PATENT DOCUMENTS 4,665,690 A * 5/1987 Nomoto et al. ................ 60/286
5,195,316 A * 3/1993 Shinzawa et al. ............. 60/274
5,423,180 A * 6/1995 Nobue et al. ................. 60/274
5,426,937 A * 6/1995 Ohuchi et al. ................ 60/276
5,716,586 A * 2/1998 Taniguchi .................... 422/173
5,743,084 A    4/1998 Hepburn
5,842,340 A * 12/1998 Bush et al. ................... 60/274
5,853,459 A * 12/1998 Kuwamoto et al. .......... 95/273
5,877,413 A * 3/1999 Hamburg et al. ........... 73/118.1
6,032,461 A * 3/2000 Kinugasa et al. ............ 60/295
6,256,981 B1 * 7/2001 Sullivan et al. ............... 60/274

FOREIGN PATENT DOCUMENTS

DE   198 23 921   12/1999
DE   199 06 287    8/2000

* cited by examiner

Primary Examiner—Binh Q. Tran
(74) Attorney, Agent, or Firm—Kenyon & Kenyon

(57) ABSTRACT

A method and a device are provided for controlling an exhaust gas aftertreatment system, for example, an exhaust gas aftertreatment system of an internal combustion engine. A first quantity characterizing the amount of substances supplied to the exhaust gas aftertreatment system, based on first characteristic operating quantities, is determined in a first operating state. A second quantity characterizing the amount of substances removed from the exhaust gas aftertreatment system, based on second characteristic operating quantities, is determined in a second operating state. The first quantity and the second quantity are then compared for error detection.

20 Claims, 2 Drawing Sheets

METHOD AND DEVICE FOR CONTROLLING AN EXHAUST GAS AFTERTREATMENT SYSTEM

FIELD OF THE INVENTION

The present invention relates to a method and a device for controlling an exhaust gas aftertreatment system, for example, an exhaust gas aftertreatment system of an internal combustion engine.

BACKGROUND INFORMATION

A method and a device for controlling an internal combustion engine having an exhaust gas aftertreatment system are described, for example, in German Published Patent Application No. 199 06 287, in which an exhaust gas aftertreatment system includes a particle filter used, for example, in direct injection internal combustion engine. The loading of the particle filter is detected as a state quantity. When specific values are exceeded, the device initiates a special operating state, in which suitable measures regenerate the particle filter.

The differential pressure, i.e., the pressure difference between the inlet and the outlet of the filter, may be evaluated to detect the load state. When the particle filter is damaged, for example, if the particle filter is torn, the load state of the filter may not be reliably detected via the differential pressure, since a portion of the exhaust gas may flow through the tear. In addition, particles may be emitted into the environment, which may result in violation of emission standards.

SUMMARY OF THE INVENTION

In accordance with an exemplary embodiment of the present invention, the exhaust gas aftertreatment system may be easily and reliably monitored by determining a second quantity, based on second characteristic operating quantities characterizing an amount of substances removed from the exhaust gas aftertreatment system in a second operating state, in which the particle filter is regenerated, and by comparing this second quantity to the first quantity characterizing an amount of substances supplied to the exhaust gas aftertreatment system. Errors may be detected when the two quantities significantly deviate from one another.

An exemplary method according to the present invention may be used in conjunction with particle filters, the amount of particles accumulating in the particle filter during normal operation being compared to the amount of particles combusted during regeneration.

It is believed that the amount of substances removed may be simply and reliably determined by evaluating the temperature upstream and downstream from the particle filter. During regeneration of the particle filter, the reaction of the particles results in a temperature increase, which may be detected using sensors upstream and downstream from the particle filter. A defect in the filter may be reliably detected based on the comparison of these two quantities.

The second quantity may include, for example, a signal characterizing the amount of oxygen in the exhaust gas. To this end, the oxygen content in the exhaust gas upstream and downstream from the filter may be detected. A conclusion as to the amount of regenerated particles may be made based on the mass of the reacted oxygen.

DETAILED DESCRIPTION

Figure 1:
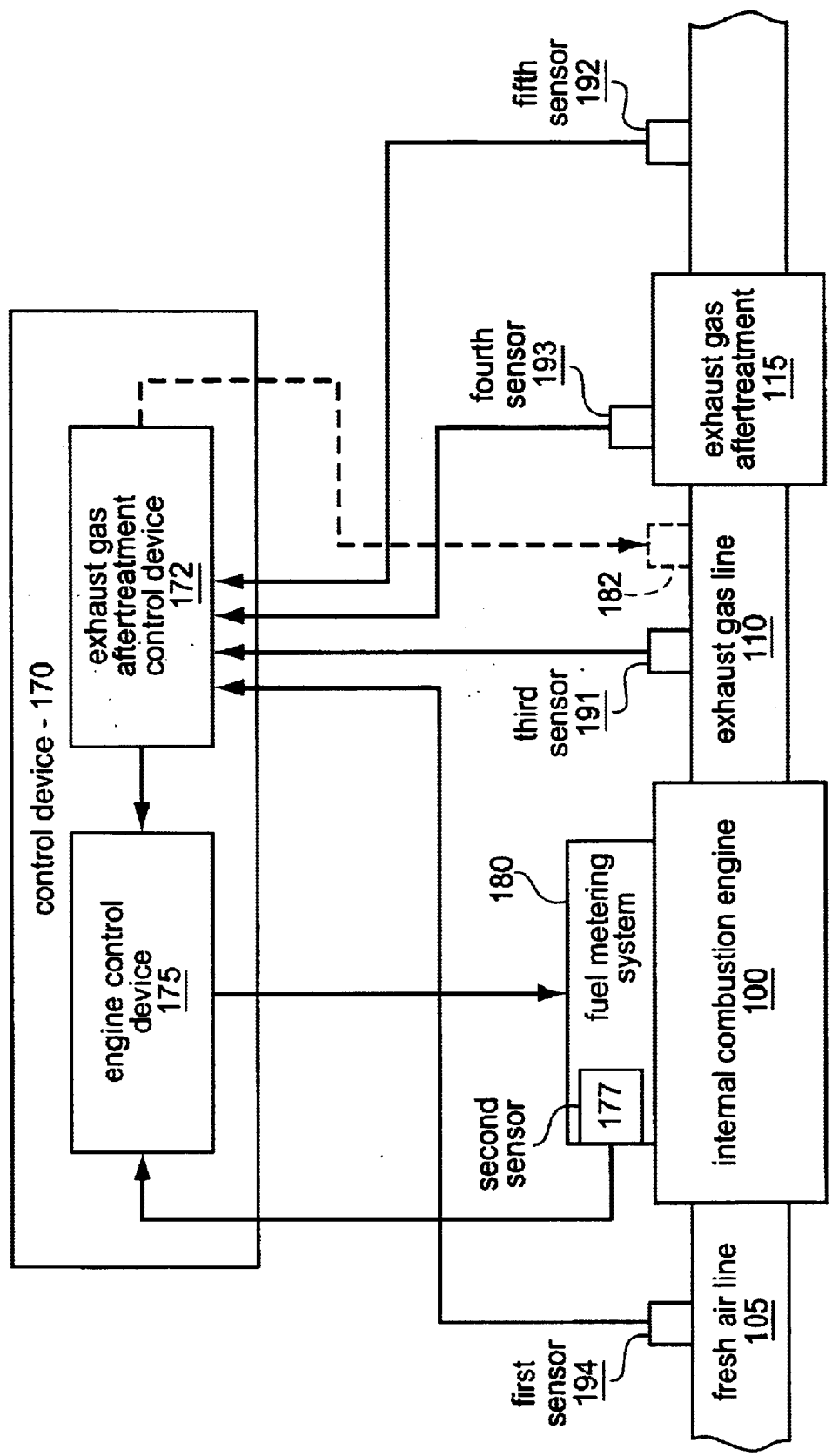
FIG. 1 is a block diagram showing an exemplary control according to the present invention.

FIG. 1 illustrates elements of an exemplary exhaust gas aftertreatment system of an internal combustion engine 100 according to the present invention. Fresh air line 105 supplies fresh air to the internal combustion engine 100. The exhaust gas from internal combustion engine 100 is discharged to the environment through an exhaust gas line 110. An exhaust gas aftertreatment system 115 is situated in the exhaust gas line. The exhaust gas aftertreatment system may be a catalyst and/or a particle filter. In addition, a plurality of catalysts for different contaminants, or combinations of at least one catalyst and one particle filter may be provided.

Furthermore, a control device 170 includes at least one engine control device 175 and one exhaust gas aftertreatment control device 172. Engine control device 175 sends control signals to a fuel metering system 180. Exhaust gas aftertreatment control device 172 sends signals to engine control device 175 and, in one exemplary embodiment according to the present invention, to an actuating element 182 situated in the exhaust gas line upstream from the exhaust gas aftertreatment system or in the exhaust gas aftertreatment system.

In addition, various sensors are provided, which supply signals to the exhaust gas aftertreatment control device and the engine control device. Thus, at least one first sensor 194 delivers signals characterizing the state of the air supplied to the internal combustion engine. A second sensor 177 delivers signals characterizing the state of fuel metering system 180. At least one third sensor 191 delivers signals characterizing the state of the exhaust gas upstream from the exhaust gas aftertreatment system. At least one fourth sensor 193 delivers signals characterizing the state of exhaust gas aftertreatment system 115. In addition, at least one fifth sensor 192 delivers signals characterizing the state of the exhaust gas downstream from the exhaust gas aftertreatment system. Sensors may be used to detect the temperature values and/or pressure values. Furthermore, sensors may be used to characterize the chemical composition of the exhaust gas and/or fresh air. These sensors may include, for example, lambda sensors, NOx sensors, or HC sensors.

First sensor 194, third sensor 191, fourth sensor 193, and fifth sensor 192 may send output signals to exhaust gas aftertreatment control device 172, and second sensor 177 may send output signals to engine control device 175. Additional sensors (not shown) may generate a signal characterizing the driver's intent, or other environmental or engine operating states.

The engine control device and the exhaust gas aftertreatment control device may form a structural entity. Alternatively, the engine control device and the exhaust gas aftertreatment control device may be two control devices, spatially separated from one another.

An exemplary method according to the present invention is described below, which may be used, for example, in conjunction with a particle filter of a direct injection internal combustion engine. However, the exemplary method according to the present invention is not limited to this application. It may be used, for example, in other internal combustion engines having an exhaust gas aftertreatment system. For example, the exemplary method according to the present invention may be used in exhaust gas aftertreatment systems having a combined catalyst and particle filter. Furthermore, the exemplary method according to the present invention may be used in systems equipped only with a catalyst.

Based on the sensor signals, engine control 175 calculates control signals to be sent to fuel metering system 180. The fuel metering system then meters the corresponding amount of fuel to internal combustion engine 100. Particles may be formed in the exhaust gas during combustion. The particle filter in exhaust gas aftertreatment system 115 absorbs these particles. Corresponding amounts of particles accumulate in particle filter 115 during operation, which may result in impaired functioning of the particle filter and/or the internal combustion engine. For this reason, a regeneration process is initiated at specific intervals or when the particle filter has reached a specific load state. This regeneration may also be described as a special operation.

The load state may be detected, for example, based on various sensor signals. Thus, the differential pressure between the inlet and the outlet of particle filter 115 may be evaluated and the load state may be determined based on various temperature values and/or pressure values. In addition, other quantities may be used for calculating or simulating the load state. One method is described, for example, in German Published Patent Application No. 199 06 287.

When the exhaust gas aftertreatment control device detects that the particle filter has reached a specific load state, regeneration is initialized. Various options are available for regenerating the particle filter. For one, certain substances may be supplied to the exhaust gas via actuating element 182, which then causes a corresponding reaction in exhaust gas aftertreatment system 115. These additionally metered substances may cause, for example, a temperature increase and/or oxidation of particles in the particle filter. Thus, for example, fuel substances and/or oxidation agents may be supplied via actuating element 182.

In one exemplary embodiment according to the present invention, an appropriate signal may be transmitted to engine control device 175 for performing a post-injection. Using post-injection, hydrocarbons may be introduced into the exhaust gas in a targeted manner, the hydrocarbons contributing to the regeneration of exhaust gas aftertreatment system 115 via an increase in temperature.

The load state may be determined based on various quantities. The different states may be detected by a comparison to a threshold value, and the regeneration may be initiated depending on the detected load state.

In another exemplary embodiment according to the present invention, sensor 191 is situated upstream from the particle filter as a first temperature sensor, and sensor 192 is situated downstream from the particle filter as second temperature sensor 192.

In still another exemplary embodiment according to the present invention, sensor 191 is situated upstream from the particle filter as a first lambda sensor, and sensor 192 is situated downstream from the particle filter as second lambda sensor 192. Both lambda sensors deliver signals characterizing the oxygen concentration in the exhaust gas.

In yet another exemplary embodiment according to the present invention, only one lambda sensor situated downstream from the particle filter is used. The oxygen concentration upstream from the particle filter is calculated based on various characteristic operating quantities or is read from a characteristic map. Also, the oxygen concentration upstream from the particle filter may be determined based on the oxygen concentration before regeneration.

Figure 2:
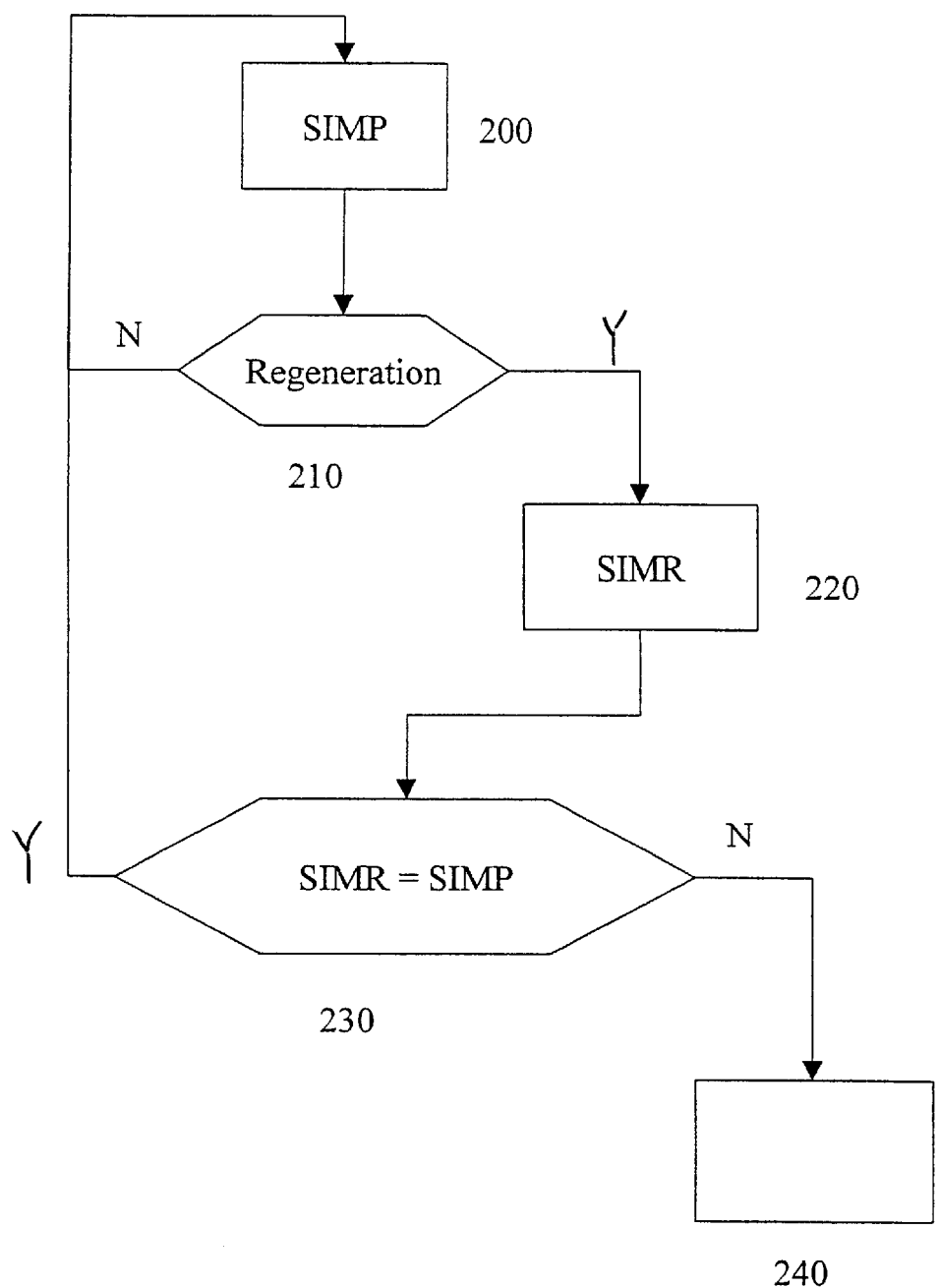
FIG. 2 is a flow diagram of an exemplary method according to the present invention.

FIG. 2 is a block diagram of an exemplary method according to the present invention for detecting a defect in the region of the exhaust gas aftertreatment system. In a first operating state, which corresponds to normal operation of the internal combustion engine, the created particles are deposited in the particle filter, and a first step 200 determines the amount of particles deposited (i.e., first quantity SIMP). This first quantity SIMP characterizes the amount of substances supplied to the exhaust gas aftertreatment system. For example, the load state of the particle filter may be used as the first quantity, or the first quantity may be determined based on the load state.

A subsequent query 210 checks whether a second operating state is present. If not, step 200 is repeated, and the first quantity is determined. If, however, query 210 detects that a second operating state is present, step 220 is then performed.

In the second operating state the particle filter is regenerated, i.e., the particles deposited in the filter are oxidized or combusted. The oxygen content of the exhaust gas is reduced and the temperature of the exhaust gas is increased. Based on one of these two quantities, a second quantity SIMR may be determined characterizing the amount of substances removed from the exhaust gas aftertreatment system.

Thus, step 220 calculates the amount of heat released based on the difference in temperatures upstream and downstream from the particle filter. In one exemplary embodiment according to the present invention, the calculation considers the heat capacity of the particle filter and/or the heat exchange, for example, the energy released to the environment. The heat capacity of the particle filter, for example, may result in dynamic effects that should be considered.

Based on various quantities, for example, the specific heat of the particles, the amount of particles combusted or removed from the filter during regeneration may be determined based on the amount of heat.

In yet another exemplary method according to the present invention, the amount of particles combusted in step 220 is determined based on a quantity characterizing the oxygen concentration in the exhaust gas. This calculation may be performed, for example, based on the decrease in the oxygen concentration in the particle filter. Based on the decrease in the oxygen concentration, the amount of reacted oxygen may be determined, and from this value, the amount of particles combusted may be determined.

After regeneration has ended, query 230 checks whether quantities SIMR and SIMP are approximately the same. That is, query 230 checks whether the first quantity and the second quantity significantly deviate from one another, for example, when the difference between quantities SIMR and SIMP is larger than a threshold value. This threshold value may be specified by an inaccuracy in determining quantities SIMR and SIMP. If the two quantities are approximately the same, step 200 is repeated. If, however, the values significantly deviate from one another, step 240 detects errors. Errors in the region of the particle filter are detected when the amount of particles supplied deviates significantly from the amount of particles combusted.

What is claimed is:

1. A method of controlling an exhaust gas aftertreatment system, the method comprising:

determining, in a first operating state, a first quantity characterizing an amount of substances supplied to the exhaust gas aftertreatment system based on first characteristic operating quantities;

determining, in a second operating state, a second quantity characterizing an amount of substances removed from the exhaust gas aftertreatment system based on second characteristic operating quantities; and comparing the first quantity and the second quantity for error detection;

wherein the first quantity includes a quantity of particles deposited in a particle filter.

2. A method of controlling an exhaust gas aftertreatment system, the method comprising:

determining, in a first operating state, a first quantity characterizing an amount of substances supplied to the exhaust gas aftertreatment system based on first characteristic operating quantities;

determining, in a second operating state, a second quantity characterizing an amount of substances removed from the exhaust gas aftertreatment system based on second characteristic operating quantities; and comparing the first quantity and the second quantity for error detection;

wherein the second quantity includes a quantity of particles removed during a regeneration of a particle filter.

3. The method according to claims 1 or 2, wherein the exhaust gas aftertreatment system is an exhaust gas aftertreatment system of an internal combustion engine.

4. The method according to claims 1 or 2, wherein an error is detected if the first quantity and the second quantity significantly deviate from one another.

5. The method according to claims 1 or 2, wherein the step of determining the second quantity is performed using at least one of an exhaust gas temperature and a quantity characterizing an amount of oxygen in the exhaust gas.

6. A device for controlling an exhaust gas aftertreatment system, the device comprising:

a first determining arrangement for determining, in a first operating state, a first quantity characterizing an amount of substances supplied to the exhaust gas aftertreatment system based on first characteristic operating quantities;

a second determining arrangement for determining, in a second operating state, a second quantity characterizing an amount of substances removed from the exhaust gas aftertreatment system based on second characteristic operating quantities; and a comparing arrangement for comparing the first quantity and the second quantity for error detection;

wherein the exhaust gas aftertreatment system is an exhaust gas aftertreatment system of an internal combustion engine, and the first quantity includes a quantity of particles deposited in a particle filter.

7. The device according to claim 6, wherein the exhaust gas aftertreatment system is an exhaust gas aftertreatment system of an internal combustion engine.

8. The device according to claim 6, wherein the second quantity includes a quantity of particles removed during a regeneration of a particle filter.

9. A device for controlling an exhaust gas aftertreatment system, the device comprising:

a first determining arrangement for determining, in a first operating state, a first quantity characterizing an amount of substances supplied to the exhaust gas aftertreatment system based on first characteristic operating quantities;

a second determining arrangement for determining, in a second operating state, a second quantity characterizing an amount of substances removed from the exhaust gas aftertreatment system based on second characteristic operating quantities; and a comparing arrangement for comparing the first quantity and the second quantity for error detection;

wherein an error is detected if the first quantity and the second quantity significantly deviate from one another, and the first quantity includes a quantity of particles deposited in a particle filter.

10. The device according to claim 9, wherein the second quantity includes a quantity of particles removed during a regeneration of a particle filter.

11. A method of controlling an exhaust gas aftertreatment system, the method comprising:

determining, in a first operating state, a first quantity characterizing an amount of substances supplied to the exhaust gas aftertreatment system based on first characteristic operating quantities;

determining, in a second operating state, a second quantity characterizing an amount of substances removed from the exhaust gas aftertreatment system based on second characteristic operating quantities; and comparing the first quantity and the second quantity for error detection;

wherein the exhaust gas aftertreatment system is an exhaust gas aftertreatment system of an internal combustion engine, and the first quantity includes a quantity of particles deposited in a particle filter.

12. The method according to claim 11, wherein the second quantity includes a quantity of particles removed during a regeneration of a particle filter.

13. A method of controlling an exhaust gas aftertreatment system, the method comprising:

determining, in a first operating state, a first quantity characterizing an amount of substances supplied to the exhaust gas aftertreatment system based on first characteristic operating quantities;

determining, in a second operating state, a second quantity characterizing an amount of substances removed from the exhaust gas aftertreatment system based on second characteristic operating quantities; and comparing the first quantity and the second quantity for error detection;

wherein an error is detected if the first quantity and the second quantity significantly deviate from one another, and the first quantity includes a quantity of particles deposited in a particle filter.

14. The method according to claim 13, wherein the second quantity includes a quantity of particles removed during a regeneration of a particle filter.

15. A method of controlling an exhaust gas aftertreatment system, the method comprising:

determining, in a first operating state, a first quantity characterizing an amount of substances supplied to the exhaust gas aftertreatment system based on first characteristic operating quantities;

determining, in a second operating state, a second quantity characterizing an amount of substances removed from the exhaust gas aftertreatment system based on second characteristic operating quantities;

comparing the first quantity and the second quantity; and detecting an error if the first quantity and second quantity deviate from one another beyond a predetermined threshold;

wherein the first quantity includes a quantity of particles deposited in a particle filter.

16. The method according to claim 15, wherein the second quantity includes a quantity of particles removed during a regeneration of a particle filter.

17. A method of controlling an exhaust gas aftertreatment system, the method comprising:

determining, in a first operating state, a first quantity characterizing an amount of substances supplied to the exhaust gas aftertreatment system based on first characteristic operating quantities;

determining, in a second operating state, a second quantity characterizing an amount of substances removed from the exhaust gas aftertreatment system based on second characteristic operating quantities;

comparing the first quantity and the second quantity; and detecting an error if the first quantity and second quantity deviate from one another beyond a predetermined threshold;

wherein the second quantity includes a quantity of particles removed during a regeneration of a particle filter.

18. A device for controlling an exhaust gas aftertreatment system, the device comprising:

a first determining arrangement for determining, in a first operating state, a first quantity characterizing an amount of substances supplied to the exhaust gas aftertreatment system based on first characteristic operating quantities;

a second determining arrangement for determining, in a second operating state, a second quantity characterizing an amount of substances removed from the exhaust gas aftertreatment system based on second characteristic operating quantities;

a comparing arrangement for comparing the first quantity and the second quantity for error detection;

a detecting arrangement for detecting an error if the first quantity and the second quantity deviate from one another beyond a predetermined threshold;

wherein the first quantity includes a quantity of particles deposited in a particle filter.

19. The device according to claim 18, wherein the second quantity includes a quantity of particles removed during a regeneration of a particle filter.

20. A device for controlling an exhaust gas aftertreatment system, the device comprising:

a first determining arrangement for determining, in a first operating state, a first quantity characterizing an amount of substances supplied to the exhaust gas aftertreatment system based on first characteristic operating quantities;

a second determining arrangement for determining, in a second operating state, a second quantity characterizing an amount of substances removed from the exhaust gas aftertreatment system based on second characteristic operating quantities;

a comparing arrangement for comparing the first quantity and the second quantity for error detection;

a detecting arrangement for detecting an error if the first quantity and the second quantity deviate from one another beyond a predetermined threshold;

wherein the second quantity includes a quantity of particles removed during a regeneration of a particle filter.

* * * * *